United States Patent
Rege et al.

(10) Patent No.: US 8,595,307 B2
(45) Date of Patent: Nov. 26, 2013

(54) SYSTEM AND METHOD FOR MULTIMEDIA MESSAGING

(71) Applicant: AT&T Intellectual Property I, L.P. (formerly known as AT&T Knowledge Ventures, LP), Atlanta, GA (US)

(72) Inventors: Nabha Rege, Austin, TX (US); Tracy Zavelson, Austin, TX (US); Melynda Ward, Lakeway, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/897,173

(22) Filed: May 17, 2013

(65) Prior Publication Data

US 2013/0252647 A1  Sep. 26, 2013

Related U.S. Application Data

(63) Continuation of application No. 11/699,753, filed on Jan. 30, 2007.

(51) Int. Cl.
G06F 15/16 (2006.01)

(52) U.S. Cl.
USPC .......................................... 709/206

(58) Field of Classification Search
USPC .......................................... 709/206
See application file for complete search history.

(56) References Cited

U.S. PATENT DOCUMENTS

| | | | |
|---|---|---|---|
| 6,263,212 B1 * | 7/2001 | Ross et al. | 455/466 |
| 6,757,531 B1 | 6/2004 | Haaramo et al. | |
| 6,842,772 B1 | 1/2005 | Delaney et al. | |
| 6,889,246 B1 * | 5/2005 | Kawamoto et al. | 709/204 |
| 7,043,233 B2 | 5/2006 | Hasegawa | |
| 7,058,586 B1 | 6/2006 | Law | |
| 2002/0087704 A1 * | 7/2002 | Chesnais et al. | 709/228 |
| 2003/0087632 A1 * | 5/2003 | Sagi et al. | 455/414 |
| 2003/0236839 A1 * | 12/2003 | Demsky et al. | 709/205 |
| 2005/0009541 A1 * | 1/2005 | Ye et al. | 455/466 |
| 2006/0168058 A1 * | 7/2006 | Midgley | 709/206 |

FOREIGN PATENT DOCUMENTS

| | | |
|---|---|---|
| EP | 0936825 A2 | 8/1999 |
| EP | 1835768 A1 | 9/2007 |

OTHER PUBLICATIONS

"Cisco Service Exchange Solution for IP Multimedia Subsystem (IMS)," Cisco Systems, Inc., www.cisco.com, Dec. 2005, 9 pages.
"ESKADENIA Software Solutions," EMMC—ESKADENIA Multimedia Messaging Centre (MMSC), www.eskadenia.com, Jan. 11, 2005, 2 pages.
"ESKADENIA Software Solutions," EWMS—ESKADENIA Wireless Messaging System, www.eskadenia.com, Nov. 4, 2005, 1 page.

(Continued)

Primary Examiner — Sulaiman Nooristany
(74) Attorney, Agent, or Firm — Toler Law Group, PC (57) ABSTRACT

A method includes receiving, at a computing device associated with a service provider, a message including multimedia content. The message is addressed to a group address associated with a plurality of group members. The method includes determining a group profile associated with the group address. The group profile includes a profile associated with a group member of the plurality of group members. The profile includes a network address associated with a multimedia data format. The group profile is defined by a sender of the message. The method includes sending the message including the multimedia content to a device associated with the network address. The multimedia content is modified based on the multimedia data format.

19 Claims, 5 Drawing Sheets

(56) References Cited

OTHER PUBLICATIONS

"Group Messaging Platform Connects Mobile Phones and Internet," www.kolabora.com, Sep. 14, 2006, 9 pages.

"Mobile Group Messaging Bridges Internet and Mobile Words Via IM, eMail, SMS, RSS: Swarmlt and SwarmPro—Video Review," http://www.masternewmedia.org/news/2006/09/08/mobile__group__messaging__bridges__internet.htm, Sep. 8, 2006, 13 pages.

"Multimedia Messaging Service," www.wikipedia.org, retrieved on Jan. 10, 2007, 4 pages.

"NeuStar: Investor Relations—News Release—NeuStar Acquires Followap, UK Based Enabler of Mobile 1M Services in Europe and Asia," www.phx.corporate-ir.net, Nov. 27, 2006, 3 pages.

"Swarm-It! Completely connected to your friends, family and clubs," www.swarmteams.com, Nov. 16, 2006, 1 page.

"The VeriSign Inter-Carrier Multimedia Messaging Service (ICMMS)," www.verisign.com, Sep. 22, 2007, 3 pages.

"VeriSign Announces Inter-Carrier Multimedia Messaging Service for Wireless Carriers Globally," www.verisign.com, Oct. 25, 2004, 1 page.

International Search Report and Written Opinion of the International Searching Authority, International Application No. PCT/US2008/000630, mailed Jun. 18, 2008.

* cited by examiner

SYSTEM AND METHOD FOR MULTIMEDIA MESSAGING

CLAIM OF PRIORITY

The present application is a continuation of and claims priority from U.S. patent application Ser. No. 11/699,753, filed on Jan. 30, 2007 and entitled "SYSTEM AND METHOD FOR MULTIMEDIA MESSAGING," the contents of which are expressly incorporated herein by reference in their entirety.

FIELD OF THE DISCLOSURE

The present disclosure is generally related to multimedia messaging.

BACKGROUND

Messaging systems, such as short message service (SMS), are increasingly popular for communications. In part, this increasing popularity of messaging may be due to the increasing availability of mobile messaging services and mobile messaging devices, such as mobile phones.

Mobile messaging devices are increasingly feature-rich. Many include features such as built in still cameras, built in video cameras, or full keyboards. Such messaging devices may allow users to send multimedia messages; however, compatibility issues may make multimedia messaging difficult in some situations. Where two users use the same type of messaging device and the same messaging service provider, messaging may be relatively straightforward. However, when a user desires to send a message to a recipient that users a different type of messaging device or a different messaging service provider, there may be compatibility problems. Hence, there is a need for an improved system and method of multimedia messaging.

DETAILED DESCRIPTION OF THE DRAWINGS

In a particular embodiment, a multimedia messaging system may include an input to receive a multimedia message sent to an address associated with a group profile. The system may also include a group profile database including at least one group profile. The at least one group profile may include routing settings associated with at least one group member. The routing settings may specify selection of at least one network address of the at least one group member. The at least one group profile may also include preferred data format settings associated with the at least one group member. The preferred data format settings may specify selection of at least one preferred multimedia data format for a multimedia message sent to the at least one group member. The system may also include logic to select at least one network address for each group member based on the routing settings and to select at least one preferred data format for each group member based on the preferred data format settings. The system may also include a conversion module to convert the multimedia message to the selected at least one preferred data format. The system may further include an output to send the message to the at least one network address for each group member.

In a particular embodiment, a method of multimedia messaging may include receiving a message including multimedia content. The message is addressed to a group address associated with a plurality of group members. The method may also include determining a first preferred multimedia data format associated with a first group member. The method may further include determining a second preferred multimedia data format associated with a second group member. The method may also include converting the multimedia content to the first preferred multimedia data format and converting the multimedia content to the second preferred multimedia data format. The method may also include sending the message including the multimedia content in the first preferred multimedia data format to a first network address associated with the first group member and sending the message including the multimedia content in the second preferred multimedia data format to a second network address associated with the second group member.

In a particular embodiment, a group profile database may include at least one group profile. The at least one group profile may include identification of a plurality of group members and routing settings associated with at least one group member. The routing settings may specify selection of at least one network address of the at least one group member. The group profile may also include preferred data format settings associated with the at least one group member. The preferred data format settings may specify selection of at least one preferred multimedia data format for a multimedia message sent to the at least one group member.

In a particular embodiment a computer readable storage device may include computer readable instructions that are executable by a processor to receive a message including multimedia content. The message may be addressed to a group address associated with a plurality of group members. The instructions may also be executable to determine a first preferred multimedia data format associated with a first group member and to determine a second preferred multimedia data format associated with a second group member. The instructions may also be executable to convert the multimedia content to the first preferred multimedia data format and to convert the multimedia content to the second preferred multimedia data format. The instructions may further be executable to send the message including the multimedia content in the first preferred multimedia data format to a first network address associated with the first group member and to send the message including the multimedia content in the second preferred multimedia data format to a second network address associated with the second group member.

Figure 1:
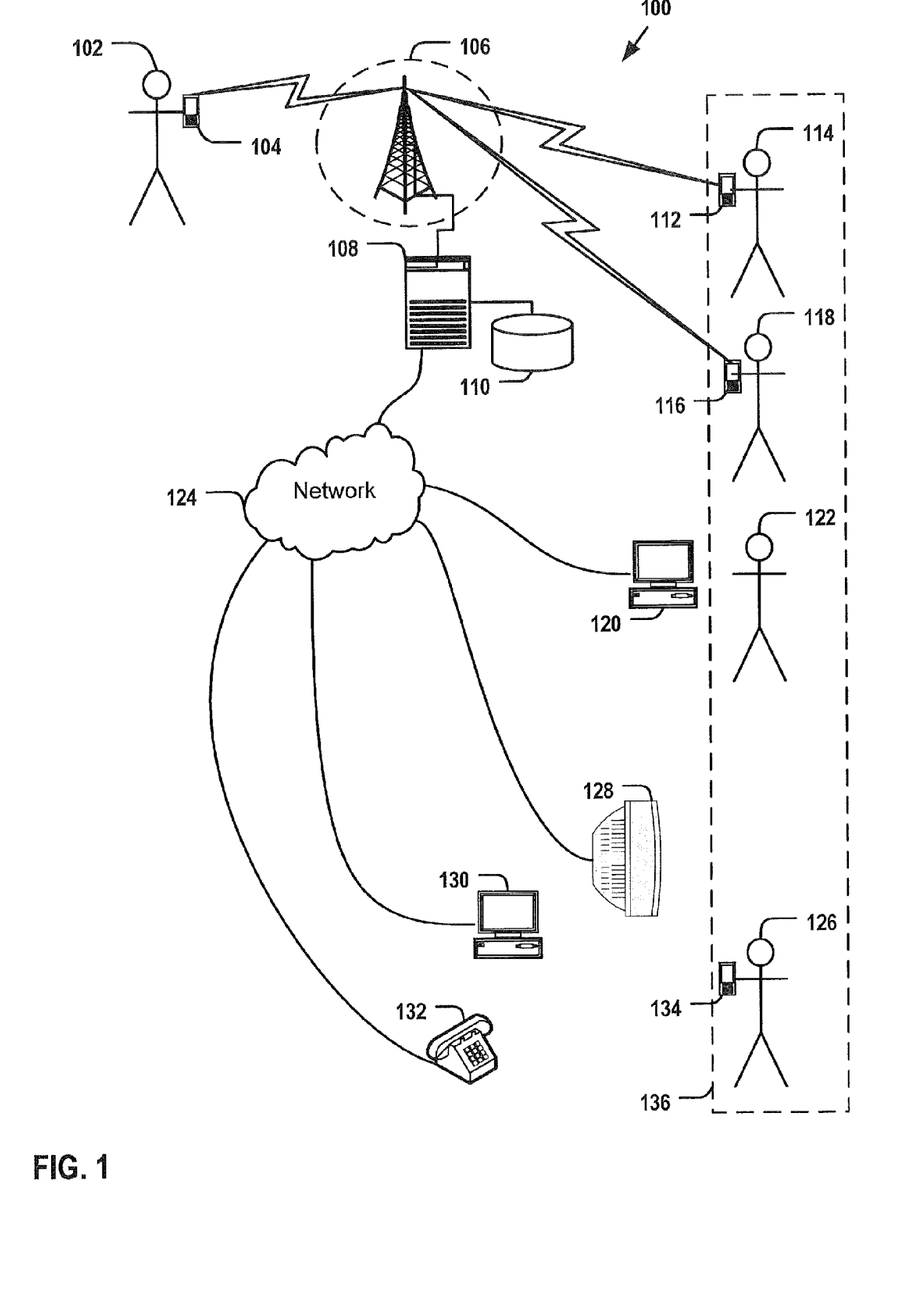
FIG. 1 is a block diagram of a first illustrative embodiment of a system for multimedia messaging.

Referring to FIG. 1, a block diagram of a first illustrative embodiment of a system for multimedia messaging is shown and designated 100. The system 100 allows a user 102 to send a multimedia message to a group of individual recipients. The individual recipients are designated 114, 118, 122 and 126 while the group collectively is designated 136. While FIG. 1 depicts four recipients 114, 118, 122, 126, the group 136 may include more or fewer recipients. Four recipients are depicted in FIG. 1 to simplify and clarify the discussion of the system.

The user 102 is associated with a messaging device 104. Additionally, each recipient in the group 136 may be associated with at least one messaging device. For example, the first recipient 114 may be associated with messaging device 112, which may be, for example, a mobile communication device, such as a mobile telephone. The second recipient 118 may be associated with messaging device 116, which may be, for example, a mobile communication device, such as a mobile telephone. The third recipient may be associated with messaging device 120, which may be, for example, a computing device. The fourth recipient may be associated with messaging devices 128, 130, 132, 134, which may include, for example, a television display device, a computing device, a landline telephone, and a mobile communication device, respectively.

The user 102 may use the user's messaging device 104 to send a multimedia message to an address associated with the group 136. In a particular embodiment, a multimedia message may include data, text, sound, still images ("pictures" or "photos"), moving images ("video"), other media content, or any combination thereof. The messaging device 104 may send the multimedia message using any communication protocol. In a typical example, the message may be sent wirelessly using a multimedia messaging service (MMS), which may allow sending of messages that include text, pictures, sound and/or video.

In a particular embodiment, the message may be received by a messaging service provider 106. The messaging service provider 106 may include a multimedia messaging server 108. In response to receiving the multimedia message addressed to the address associated with the group 136, the multimedia messaging server 108 may access a group profile database 110. The group profile database 110 may include information that allows the multimedia messaging server 108 to forward the message to each of the members of the group 136 in a format that each member of the group 136 can receive and access. In an illustrative embodiment, the group profile database 110 may include a group profile associated with the group 136. The group profile may include routing settings for each of the recipients 114, 118, 122, 126 in the group 136. The routing settings may specify selection of at least one network address associated with each recipient 114, 118, 122, 126. For example, the routing settings may specify that the message be sent to the first recipient 114, the second recipient 118 and the third recipient 122 at network addresses associated with their respective messaging devices 112, 116, 120. The routing settings may also specify selection of one or more of the messaging devices 128, 130, 132, 134 associated with the fourth recipient 126. The routing settings may also specify selection of a network address to which the message should be sent.

In a particular embodiment, the group profile may also include preferred data format settings for each recipient 114, 118, 122, 126 in the group 136. For example, the group profile may also specify selection of a particular data format for multimedia content to be sent to the messaging device 112 of the first recipient 114, a particular data format for multimedia content to be sent to the messaging device 116 of the second recipient 118, a particular data format for multimedia content to be sent to the messaging device 120 of the third recipient 122, and a particular data format for multimedia content to be sent to each of the messaging devices 128, 130, 132, 134 of the fourth recipient 126.

After selecting the routing and data format information, the messaging server 108 may convert the multimedia content to the selected data format or data formats, and send the message to the selected network addresses. The message may, for example, be transmitted wirelessly or sent via a network 124 in communication with the messaging server 108 or message service provider 106, and one or more messaging devices.

Figure 2:
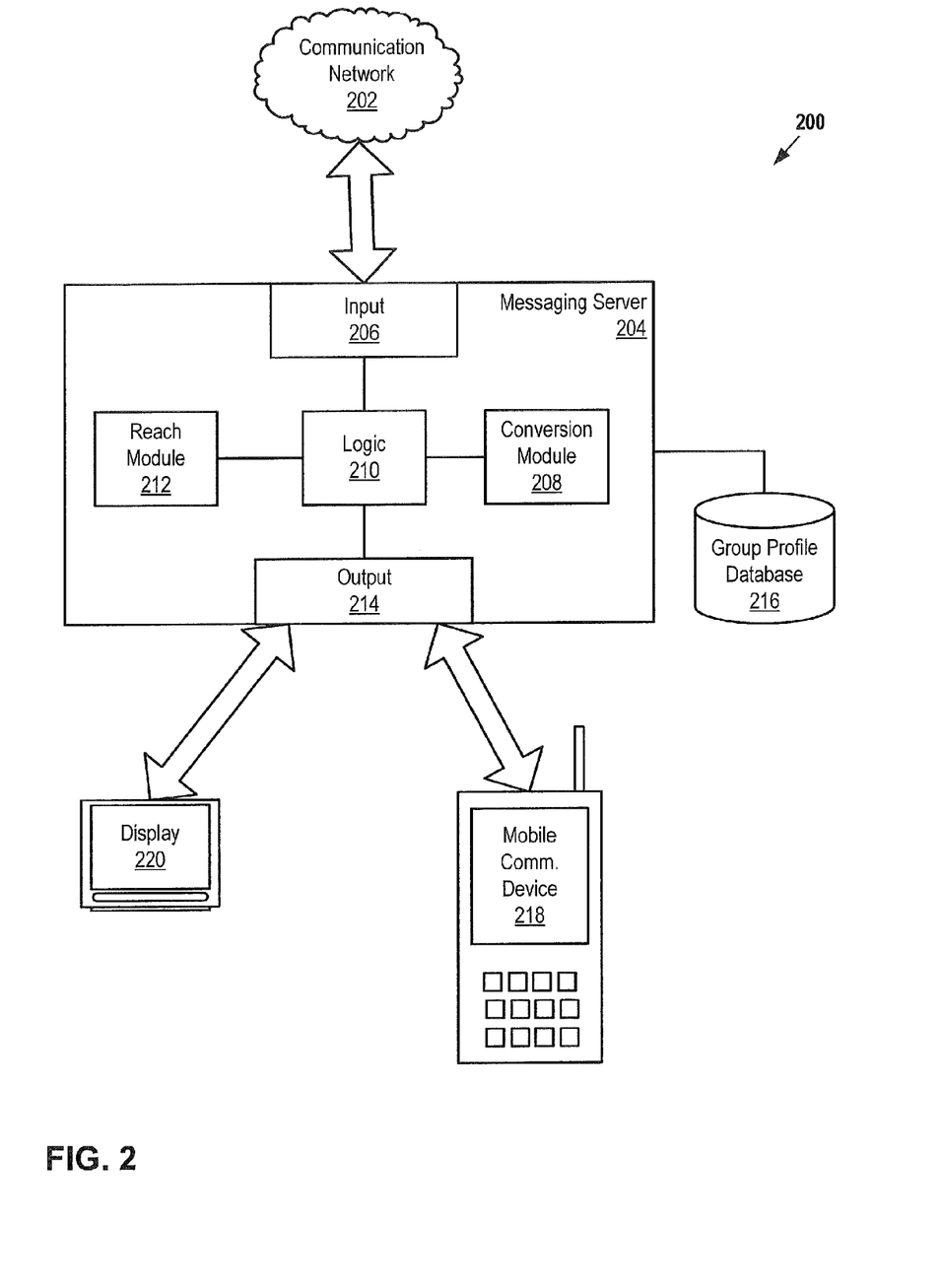
FIG. 2 is a block diagram of a second illustrative embodiment of a system for multimedia messaging.

FIG. 2 depicts a block diagram of a second illustrative embodiment of a system for multimedia messaging designated 200. The system 200 includes a messaging server 204 in communication with a communication network 202 and one or more messaging device, such as display 220 and mobile communication device 218.

The messaging server 204 includes an input 206, an output 214, logic 210, a reach module 212, and a conversion module 208. Additionally, the messaging server 204 may include or be in communication with a group profile database 216.

In a particular embodiment, the input 206 may be configured to receive a multimedia message sent to an address associated with a group profile via the communication network 202. In a particular illustrative embodiment, the communication network 202 may include a wireless communication system, and the input 206 may include an interface to communicate with the wireless communication system. In another particular illustrative embodiment, the communication network 202 may include a wireline communication system, and the input 206 may include an interface to communicate with the wireline communication system. The input 206 may receive the multimedia message and pass the message to logic 210 for analysis and processing.

The logic 210 may identify a group address from the message and select a group profile from the group profile database 216 associated with the group address. The logic 210 may select at least one network address for each group member based on routing settings in the group profile. The logic 210 may also select at least one preferred data format for each group member based on preferred data format settings retrieved from the group profile.

In an illustrative embodiment, the group profile accessed from the group profile database 216 may include an identification of the members of the group and may include or be associated with a recipient profile for each member of the group. In an illustrative embodiment, the identification of each member may point to the recipient profile for that member. Each recipient profile may include routing settings associated with the recipient. The routing settings may specify selection of at least one network address for the recipient. For example, the routing settings may specify selection of a particular network address from among a plurality of network addresses associated with the recipient based on time, the type of the message, the location of the recipient, the content of the message, other factors associated with the recipient, other factors associated with the sender, or any combination thereof.

In an illustrative embodiment, the recipient profile may also include preferred data format settings associated with the recipient. The preferred data format settings may specify selection of a preferred multimedia data format for multimedia messages to be sent to the recipient. In a particular embodiment, the preferred data format may be selected based on the network address selected using the routing settings, time, the type of the message, the location of the recipient, the content of the message, other factors associated with the recipient, other factors associated with the sender, or any combination thereof. For example, if the routing settings specify that the message should be sent to a mobile communication device 218 associated with the recipient, the preferred data format settings may specify that the message should be sent in a data format compatible with the mobile communication device 218. In an illustrative embodiment, the preferred data format settings may specify selection of a preferred data format for each multimedia component of the message. For example, a preferred data format setting may include separate preferred data formats associated with data, text, sound, pictures, and video message components of the message.

In a particular embodiment, the conversion module 208 may convert the multimedia message to the selected preferred data format(s). In an illustrative embodiment, the conversion module 208 may convert voice content to text, or text content to voice. In another illustrative embodiment, the conversion module 208 may convert between a variety of image file formats, such as joint photographic experts group (JPEG), tagged image file format (TIFF), bit mapped format (BMP), graphic interchange format (GIF), or any other lossy or lossless image file format. In another illustrative embodiment, the conversion module 208 may convert between a variety of video formats, such as multimedia messaging service format (MMS), moving picture experts group format (MPEG), DivX format, windows media video format (WMV), RealVideo format, or any other lossy or lossless video file format.

In a particular embodiment, the reach module 212 may implement a reach process. A reach process refers to a method of attempting to verify receipt of a message by sending the message to a plurality of network addresses associated with a recipient one-by-one until a response is received or the message is sent to the last network address. In an illustrative embodiment, the recipient profile may designate the recipient as a reach recipient. For example, the recipient profile may include reach settings. The reach settings may specify a plurality of network addresses associated with the reach recipient and an order in which to use the network addresses to send the multimedia message to the reach recipient. In an illustrative embodiment, the order may be determined based on time, the type of the message, the location of the recipient, the content of the message, other factors associated with the recipient, other factors associated with the sender, or any combination thereof. In an illustrative embodiment, the reach settings may also specify a time to wait for an acknowledgement of receipt of the multimedia message before sending the multimedia message to the next network address. For example, the reach settings may specify that after sending a message to an email address associated with a reach recipient, the messaging server should wait 10 minutes for a response confirming receipt of the message. If the response is not receive within 10 minutes, the messaging server may select the next network address associated with the reach recipient, format the message to the preferred data format associated with such next network address, and send the message to the next network address.

In a particular embodiment, the group profile database may be configurable by the user. For example, the user may modify the group membership, routing settings, preferred data format settings, reach settings, other settings associated with the group profile, or any combination thereof. In an illustrative embodiment, the user may interact with the group profile database via the communication network 202 to make desired changes.

The messaging server 204 may send the message via the output 214 to the selected network address for each group member. In a particular embodiment, the output 214 may include an interface to a wireless communication system, an interface to a wired communication system, or both. In an illustrative embodiment, the output 214 may include an interface to an electronic mail system.

In a particular embodiment, the reach module 212, the conversion module 208, the group profile database 216, or other components of the multimedia messaging system 200 may be implemented in hardware or software stored in a memory accessible by the logic 210. The logic 210 also may be implemented in hardware or software. For example, the logic 210 may include rules stored in a memory and executable by a processor. In an illustrative embodiment, the messaging server 204 may include a memory with instructions executable by the logic 210 to receive a message including multimedia content addressed to a group address. The instructions may also be executable by the logic 210 to determine a network address associated with each group member and a preferred multimedia data format associated with each group member. For example, the instructions may direct the logic 210 to access a group profile associated with the group address. The group profile may include data useable by the logic 210 to select a network address and a preferred multimedia data format associated with each group member. The instructions may also be executable by the logic 210 to convert the multimedia content of the message to the preferred data format associated with each group member and to send the message including the multimedia content in the preferred multimedia data format to the network address associated with the each group member.

Figure 3:
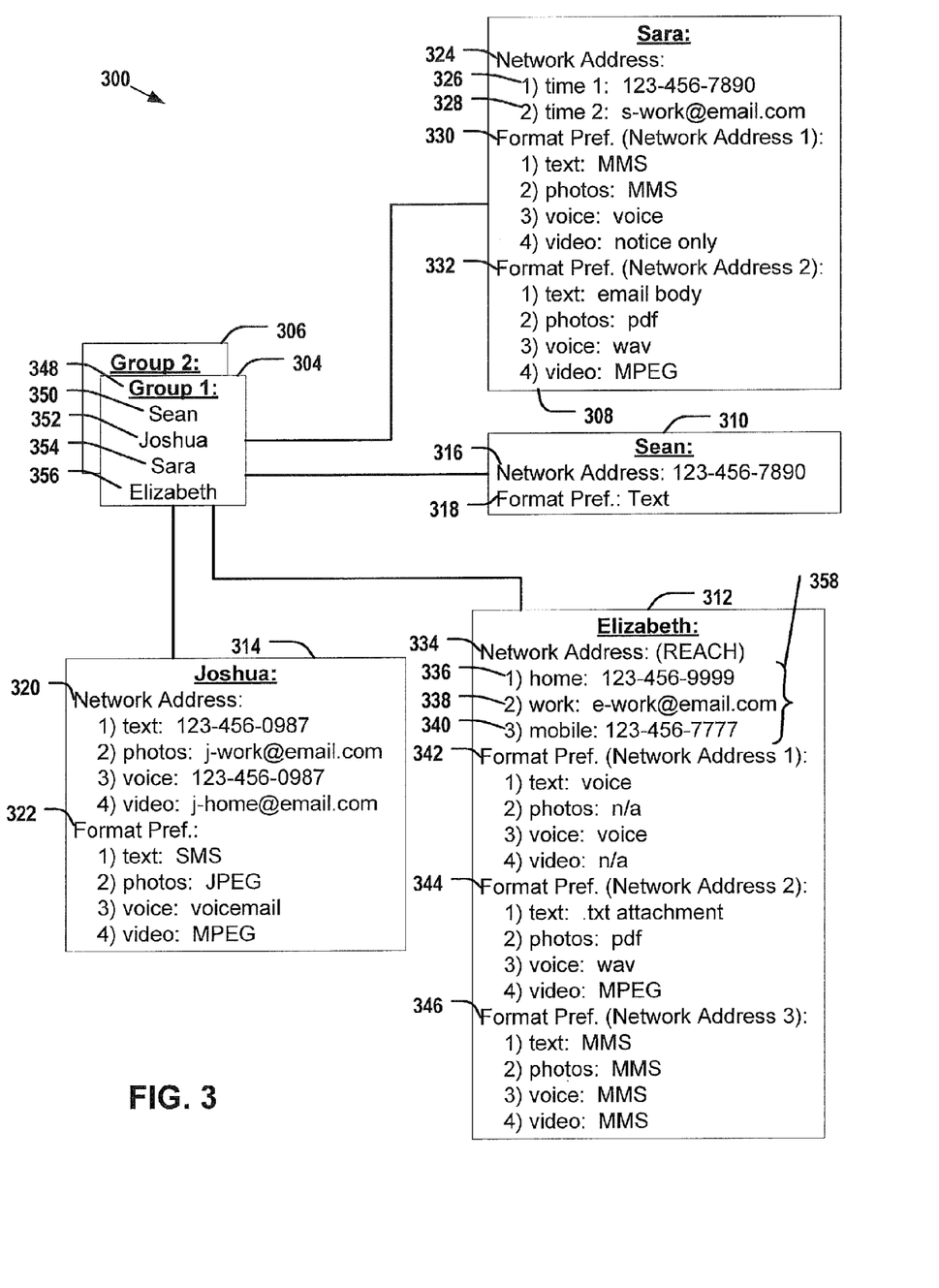
FIG. 3 is a block diagram of an illustrative embodiment of a group profile database for multimedia messaging.

FIG. 3 depicts a diagram of an illustrative embodiment of a group profile database, designated 300. The group profile database may include one or more group profiles, such as a first group profile 304 and a second group profile 306. For the sake of simplicity and clarity, only the first group profile 304 is described in detail. In an illustrative embodiment, the second group profile 306 may include features similar to the first group profile 304. Additionally, the group profile database 300 may include any number of group profiles.

In a particular embodiment, the group profile 304 may be associated with a group address 348 which may identify the group profile 304. The group profile 304 may include an identification 350, 352, 354, 356 of each group member. The identification 350, 352, 354, 356 of each group member may be associated with a recipient profile 308, 310, 312, 314 of the group member. In an illustrative embodiment, the identification 350, 352, 354, 356 may include a name, a user-specified identifier, a unique database key identifier, another identifier, or any combination thereof. For purposes of discussion, in FIG. 3, the identification 350, 352, 354, 356 of each group member is depicted simply as the recipient's name: Sean, Joshua, Sara and Elizabeth. Recipient Sean is associated with recipient profile 310. Recipient Joshua is associated with recipient profile 314. Recipient Sara is associated with recipient profile 308. Recipient Elizabeth is associated with recipient profile 312.

The recipient profile 310 depicts a first illustrative embodiment of a recipient profile. The recipient profile 310 includes only one network address 316 associated with the recipient. Additionally, the recipient profile 310 includes only one preferred data format 318 associated with the recipient. In this illustrative embodiment, each message sent to the group address 348 may be sent to recipient Sean at the network address 316 in the text data format 318.

The recipient profile 314 depicts a second illustrative embodiment of a recipient profile. The recipient profile 314 includes a plurality of network addresses 320 associated with the recipient Joshua. The recipient profile 314 also indicates that each of the network addresses 320 is associated with a particular type of message. For example, text messages and voice messages may be sent to a first address, "123-456-0987", messages with still images ("photos") may be sent to a second network address "j-work@email.com", and messages with moving images ("video") may be sent to a third network address, "j-home@email.com." The recipient profile 314 also includes preferred data format settings which indicate a preferred data format 322 associated with each type of message. For example, message text content may be sent in a first format, "SMS", message still image content may be sent in a second format, "JPEG", message audio content ("voice") may be sent in a third format, "voicemail," and message video content may be sent to a fourth format, "MPEG."

Based on the recipient profile 314, a message sent to the group address 348 may be sent to recipient Joshua at an address selected in dependence upon the type of message or the content of the message. For example, an SMS message including only text may be sent to the network address "123-456-0987" designated for receipt of text messages. Additionally, the message may be sent in an SMS data format as specified by the data format preference settings 322.

The recipient profile 308 depicts a third illustrative embodiment of a recipient profile. The recipient profile 308 includes a plurality of network addresses 324 associated with the recipient Sara. The recipient profile 308 also indicates that each of the network addresses 324 is associated with a particular time 326, 328. For example, messages sent during "time 1" may be sent to recipient Sara at a first address, "123-456-7890", while messages sent during "time 2" may be sent to recipient Sara at a second network address, "s-work@email.com." The recipient profile 308 also includes preferred data format settings 330, 332 associated with each of the network addresses 324.

The recipient profile 312 depicts a fourth illustrative embodiment of a recipient profile. The recipient profile 312 includes a plurality of network addresses 334 associated with recipient Elizabeth. The recipient profile 312 also includes reach profile settings 358. The reach profile settings 358 indicate that messages sent to recipient Elizabeth should be sent first to a first network address 336, "home", next to a second network address 338, "work", and finally to a third network address 340, "mobile." Additionally, each of the network addresses 336, 338, 340 is associated with preferred data format settings 342, 344, 346.

The particular arrangement and contents of the group profile database 300 illustrated in FIG. 3 is simplified to clarify the discussion of the database. In particular embodiments, the group profile database 300 may be implemented in any data structure, including, for example, a flat file (or flat database), a hierarchical database, a relational database, an object database, any other data structure, or any combination thereof. Additionally, the recipient profiles 308, 310, 312, 314 may include any combination of the settings described herein. For example, a recipient profile may include settings that select a particular network address based on time, the type of the message, the location of the recipient, the content of the message, other factors associated with the recipient, other factors associated with the sender, or any combination thereof. In another example, the recipient profile may include settings that select a preferred data format based on a network address, time, the type of the message, the location of the recipient, the content of the message, other factors associated with the recipient, other factors associated with the sender, or any combination thereof.

Figure 4:
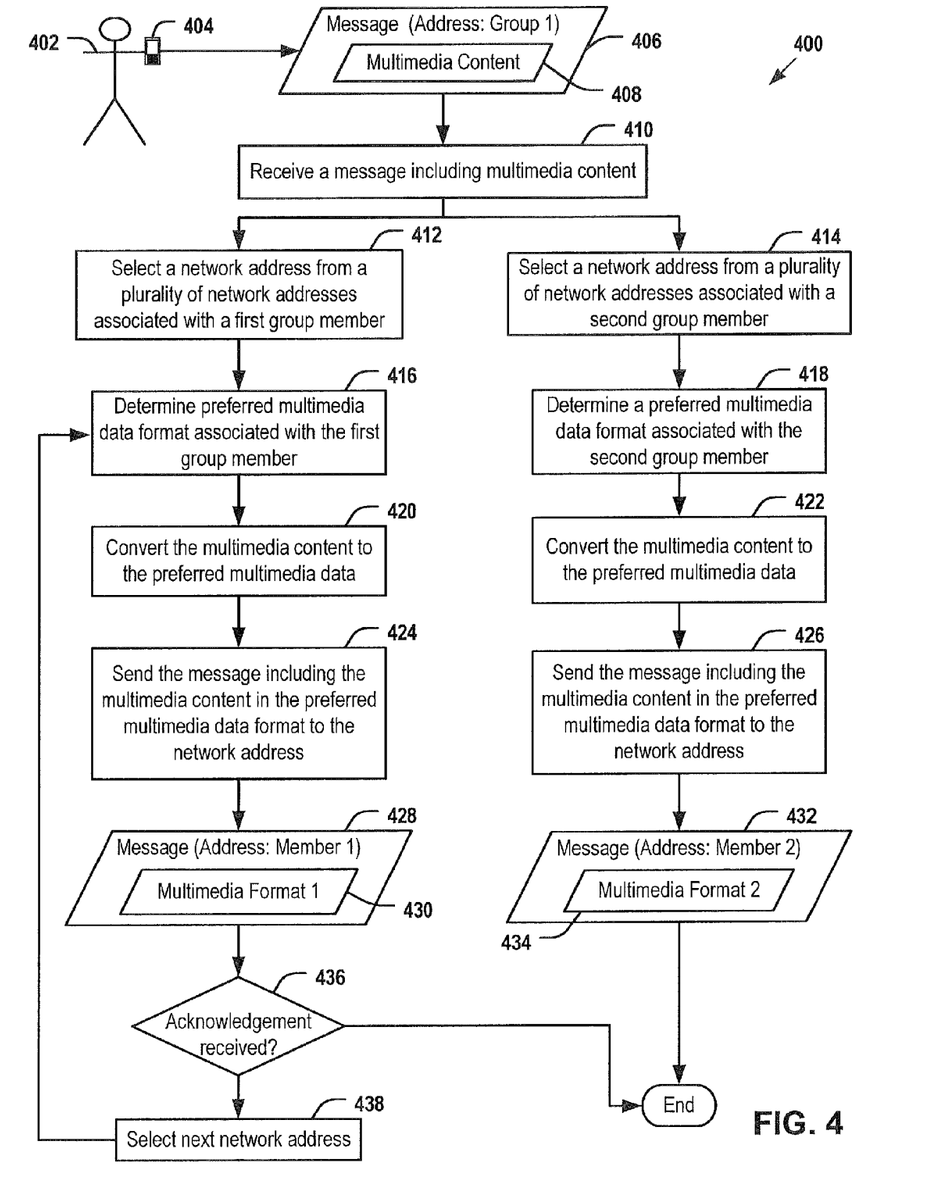
FIG. 4 is a flow chart of an illustrative embodiment of a method of multimedia messaging.

FIG. 4 depicts a flow chart of an illustrative embodiment of a method of multimedia messaging, designated 400. The method 400 includes, at 410, receiving a message 406 including multimedia content 408. For example, the message 406 may be sent by a user 402 via a messaging service using messaging device 404. The message 406 may be addressed to a group address, "Group 1," associated with a plurality of group members. In an illustrative embodiment, the user 402 may be a subscriber to a messaging service that controls the messaging system and/or messaging server. In a particular illustrative embodiment, the members of the group need not be subscribers to the messaging service. For example, the members of the group may be subscribers of one or more other messaging service providers.

In a particular embodiment, the method 400 may include, at 412, selecting a first network address from a plurality of network addresses associated with a first group member. The method 400 may also include, at 414, selecting a second network address from a plurality of network addresses associated with a second group member. For simplicity of discussion, the method 400 includes only two members in the group. In particular embodiments, the group may include more than two group members. In such embodiments, the method 400 may select a network address associated with each group member.

The method 400 may also include, at 416, determining a first preferred multimedia data format associated with the first group member, and, at 418, determining a second preferred multimedia data format associated with a second group member. The method 400 may also include, at 420, converting the multimedia content to the first preferred multimedia data format, and, at 422, converting the multimedia content to the second preferred multimedia data format.

The method 400 also includes, at 424, sending the message 428 including the multimedia content in the first preferred multimedia data format 430 to a first network address, "Member 1," associated with the first group member. The method 400 also includes, at 426, sending the message 432 including the multimedia content in the second preferred multimedia data format 434 to a second network address, "Member 2," associated with the second group member.

In a particular embodiment, the first group member may be a reach recipient and the recipient profile for the first group member may include reach settings. The reach settings may specify a plurality of network addresses associated with the first group member and an order in which those network addresses should be used to attempt to verify receipt of the message by the first group member. The reach settings may also specify an amount of time to await an acknowledgement of receipt of the message before sending the message to the next network address. In such embodiments, after sending the message to the first group member at the first network address, the method 400 may include, at 436, awaiting an acknowledgement of receipt and determining whether the acknowledgement was received. If the acknowledgement was not received within the predetermined time limit, the method may include, at 438, selecting a next network address associated with the first group member. The method may also include determining a preferred multimedia data format associated with the next network address. The method may also include converting the multimedia content to the preferred multimedia data format, and sending the message including the multimedia content in the preferred multimedia data format to the next network address.

Figure 5:
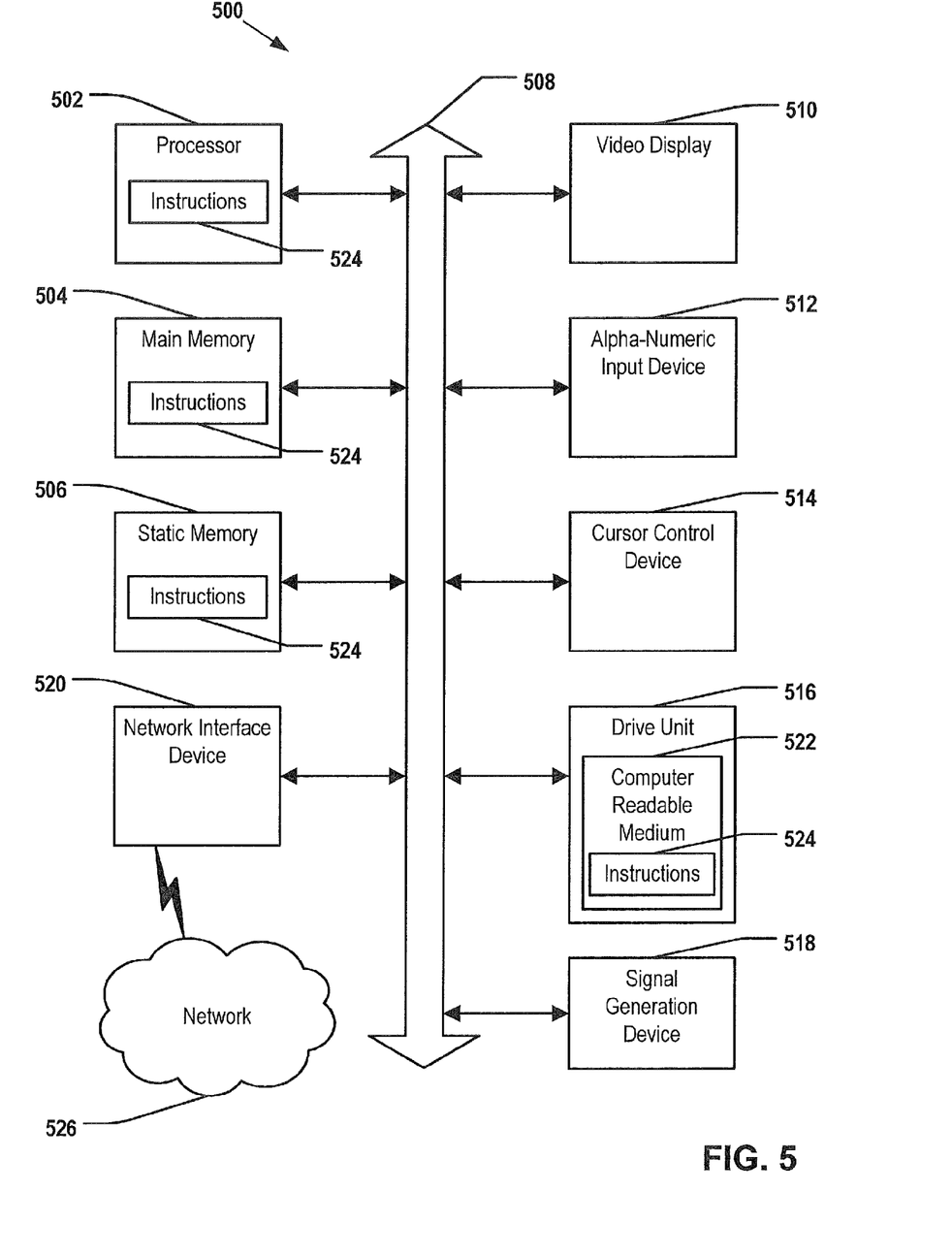
FIG. 5 is a block diagram of an illustrative embodiment of a computer system for multimedia messaging.

Referring to FIG. 5, an illustrative embodiment of a general computer system is shown and is designated 500. The computer system 500 can include a set of instructions that can be executed to cause the computer system 500 to perfoim any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a messaging device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide data, text, voice, picture, or video communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506, that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video, data, or any combination thereof over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, at a computing device associated with a service provider, a message including multimedia content, wherein the message is addressed to a group address associated with a plurality of group members;
    determining a group profile associated with the group address, the group profile including a profile associated with a group member of the plurality of group members, the profile including a network address associated with a multimedia data format, and wherein the group profile is defined by a sender of the message;
    sending the message including the multimedia content to a device associated with the network address, wherein the multimedia content is modified based on the multimedia data format; and
    sending the message to a second network address in response to a determination that an acknowledgement was not received from the device associated with the network address within a time period, wherein the acknowledgement indicates that the message has been received by the device, wherein the message sent to the second network address includes the multimedia content modified based on a second multimedia data format associated with the second network address, and wherein the second network address is selected from a plurality of network addresses associated with the profile.

2. The method of claim 1, wherein the sender of the message is not one of the plurality of group members.

3. The method of claim 1, wherein the message is received from a second device associated with a second group member of the plurality of group members, wherein the second group member is not subscribed to the service provider, and wherein the group member is not subscribed to the service provider.

4. The method of claim 3, wherein a third group member of the plurality of group members is subscribed to the service provider.

5. The method of claim 1, wherein the message is received from a second device associated with a second group member of the plurality of group members and wherein the group member and the second group member are subscribed to the service provider.

6. The method of claim 1, wherein the computing device is a communication server of the service provider.

7. The method of claim 1, further comprising selecting the multimedia data format from a plurality of multimedia data formats associated with the network address, wherein the multimedia data format is selected based on a location of the group member associated with the profile.

8. The method of claim 1, further comprising selecting the multimedia data format from a plurality of multimedia data formats associated with the network address, wherein the multimedia data format is selected based on a time when the message is received.

9. The method of claim 1, further comprising selecting the network address from the plurality of network addresses associated with the profile, wherein the network address is selected based on a priority order indicated in the profile.

10. The method of claim 1, further comprising:
    selecting a second profile from the group profile, wherein the second profile is associated with a second group member of the plurality of group members, and wherein the second profile includes a third network address associated with the second multimedia data format; and
    sending the message including the multimedia content to the third network address, wherein the multimedia content is modified based on the second multimedia data format.

11. A system comprising:
    a processor;
    a memory accessible to the processor, the memory including instructions that are executable by the processor to perform operations comprising:
        receiving a message including multimedia content, wherein the message is addressed to a group address associated with a plurality of group members;
        determining a group profile associated with the group address, the group profile including a profile associated with a group member of the plurality of group members, the profile including a network address associated with a multimedia data format, wherein the group profile is defined by a sender of the message;
        sending the message including the multimedia content to a device associated with the network address, wherein the multimedia content is modified based on the multimedia data format; and
        sending the message to a second network address in response to a determination that an acknowledgement was not received from the device associated with the network address within a time period, wherein the acknowledgement indicates that the message has been received by the device, wherein the message sent to the second network address includes the multimedia content modified based on a second multimedia data format associated with the second network address, and wherein the second network address is selected from a plurality of network addresses associated with the profile.

12. The system of claim 11, wherein the processor and the memory are included in a computing device associated with a messaging service provider.

13. The system of claim 12, wherein the message is received from a second device associated with a second group member of the plurality of group members, wherein the second group member is not subscribed to the messaging service provider, and wherein the group member is subscribed to the messaging service provider.

14. The system of claim 11, wherein the operations further comprise selecting the network address from the plurality of network addresses associated with the profile, wherein the network address is selected based on a location of a recipient of the message, content included in the message, a type of the message, or a combination thereof.

15. The system of claim 11, wherein the operations further comprise selecting the multimedia data format from a plurality of multimedia data formats associated with the network address, and wherein the multimedia data format is selected based on a location of the group member associated with the profile, a time when the message is received, or both.

16. The system of claim 11, wherein the multimedia data format includes a set of component multimedia formats including a data format, a text format, an audio format, an image format, a video format, or a combination thereof.

17. The system of claim 16, wherein the message includes a plurality of distinct components, each distinct component corresponding to a particular component multimedia format of the set of component multimedia formats.

18. A computer readable storage device including instructions executable by a processor to perform operations comprising:

receiving, at a computing device associated with a service provider, a message including multimedia content, wherein the message is addressed to a group address associated with a plurality of group members;

determining a group profile associated with the group address, the group profile including a profile associated with a group member of the plurality of group members, the profile including a network address associated with a multimedia data format, wherein the group profile is defined by a sender of the message;

sending the message including the multimedia content to a network device having the network address, wherein the multimedia content is modified based on the multimedia data format; and sending the message to a second network address in response to a determination that an acknowledgement was not received from the device associated with the network address within a time period, wherein the acknowledgement indicates that the message has been received by the device, wherein the message sent to the second network address includes the multimedia content modified based on a second multimedia data format associated with the second network address, and wherein the second network address is selected from a plurality of network addresses associated with the profile.

19. The computer readable storage device of claim 18, wherein the operations further comprise modifying the multimedia content based on the multimedia data format, wherein the multimedia data format is selected from a plurality of multimedia data formats associated with the network address, and wherein the multimedia data format is selected based on a type of the message, based on content included in the message, or both.

* * * * *